_United States Patent_ [19]

Sato et al.

[11] Patent Number: 4,624,936

[45] Date of Patent: Nov. 25, 1986

[54] METHOD FOR PREPARING HYDROCARBON CATALYTIC CRACKING CATALYST COMPOSITIONS

[75] Inventors: Goro Sato; Masamitsu Ogata, both of Kita-Kyushu; Toshiharu Hirai, Munakata, all of Japan

[73] Assignee: Catalysts & Chemicals Industries Co., Ltd., Tokyo, Japan

[21] Appl. No.: 714,150

[22] Filed: Mar. 20, 1985

[30] Foreign Application Priority Data

Mar. 21, 1984 [JP] Japan ................................ 59-53897

[51] Int. Cl.[4] ........................ B01J 29/06; B01J 37/00
[52] U.S. Cl. ........................................ 502/65; 502/64
[58] Field of Search .................................. 502/64, 65

[56] References Cited

U.S. PATENT DOCUMENTS 3,346,512 10/1967 Gladrow et al. .................. 502/65
3,471,410 10/1969 Oleck et al. ...................... 502/65
4,357,265 11/1982 Chiang ............................. 502/64

FOREIGN PATENT DOCUMENTS 57-116 5/1982 Japan ................................ 502/64

Primary Examiner—Carl F. Dees
Attorney, Agent, or Firm—Flynn, Thiel, Boutell & Tanis

[57] ABSTRACT

Impregnation of a crystalline aluminosilicate-containing cracking catalyst with a metal component of Group IVB enhances the catalytic activity, gasoline selectivity and thermal and hydrothermal stability of the catalyst, and further improves the catalyst's capacity of producing a high-octane gasoline.

7 Claims, No Drawings

METHOD FOR PREPARING HYDROCARBON CATALYTIC CRACKING CATALYST COMPOSITIONS

BACKGROUND OF THE INVENTION

The present invention relates to a method for preparing hydrocarbon cracking catalyst compositions, in particular relates to a method for preparing catalyst compositions which exhibit high catalytic activity, gasoline selectivity and thermal and hydrothermal stability, and further can produce a high-octane gasoline.

Catalytic cracking of hydrocarbon originally aims at the production of gasoline. Therefore, catalysts used herein are required to possess high catalytic activity and gasoline selectivity, and are preferred to be capable of producing a high-octane gasoline. In addition, the thermal and hydrothermal stability endurable for repeated uses is also one of the requisites for cracking catalysts because it is customary in the commercially practiced catalytic cracking process to repeat the operation which comprises regenerating the deactivated catalysts which have been used in the reaction and thereafter employing the thus regenerated catalysts again in the reaction.

In the typical hydrocarbon catalytic cracking process, there has generally been used the catalyst which comprises a crystalline aluminosilicate zeolite dispersed in a porous matrix selected from silica, silica-alumina, silica-magnesia and the like. When this catalyst is classified from the viewpoint of the exchangeable cations of the crystalline aluminosilicate zeolite, this catalyst can be roughly classified into the one in which the crystalline aluminosilicate zeolite dispersed in the porous matrix takes the hydrogen form and the other in which the crystalline aluminosilicate zeolite dispersed in the matrix is ion-exchanged with rare earth metal. The former catalyst is generally inferior in catalytic activity and gasoline selectivity but is advantageous in that it can produce a high-octane gasoline, as compared with the latter catalyst, and the latter catalyst, in contrast with this, is superior in catalytic activity and gasoline selectivity but is disadvantageous in that it can not produce a high-octane gasoline. However, the latter catalyst possesses the thermal and hydrothermal stability exceeding that of the former catalyst, because the crystalline aluminosilicate zeolite has been ion-exchanged by the rare earth metal in the case of the latter catalyst.

It is to be noted that even the former catalyst using the crystalline aluminosilicate zeolite taking the hydrogen form can improve the thermal and hydrothermal stability of the catalyst by using the so-called ultra-stable crystalline aluminosilicate zeolite. In such a case, however, merits and demerits as stated above are caused depending upon whether the ultra-stable crystalline aluminosilicate zeolite takes the hydrogen form or the rare earth form, that is when the former is used, it is impossible to expect the catalytic activity, gasoline selectivity and thermal and hydrothermal stability to such an extent that can be expected when the latter is used, and when the latter is used in contrast with this, it is impossible to produce a high-octane gasoline to such an extent as the use of the former does.

In the case of the conventional catalytic cracking catalysts which comprise a crystalline aluminosilicate zeolite dispersed in a porous matrix, in short, limits are set to the improvement of catalytic activity, gasoline selectivity and thermal and hydrothermal stability so far as said aluminosilicate zeolite takes the hydrogen form, and limits are set to the improvement of the octane number of the product gasoline so far as the aluminosilicate takes the rare earth form.

SUMMARY OF THE INVENTION

In view of such actual circumstances of the conventional catalysts, we have carried out various studies so as to develop further improved cracking catalysts to find that in case a metal component coming under Group IVB of the Periodic Table which gives a higher melting oxide than silica is introduced in the catalyst which comprises a crystalline aluminosilicate zeolite dispersed in a porous matrix, the catalyst using the crystalline aluminosilicate zeolite in the hydrogen form can improve its own catalytic activity, gasoline selectivity and thermal and hydrothermal stability without spoiling the octane number of the gasoline to be produced, while the catalyst using the aluminosilicate zeolite in the rare earth form can improve the octane number of the gasoline to be produced without spoiling its own catalytic activity, gasoline selectivity and thermal and hydrothermal stability.

The method for preparing hydrocarbon cracking catalyst compositions according to the present invention is characterized by the steps of spray drying an aqueous slurry of a mixture of a precursor of a porous matrix and a crystalline aluminosilicate zeolite to thereby prepare a fine spherical particle, washing this particle and drying, and thereafter introducing a metal component coming under Group IVB of the Periodic Table in this particle.

DETAILED DESCRIPTION

In the present invention, the precursor of the porous matrix denotes a hydrosol or hydrogel which gives, on drying, a silica-containing porous inorganic oxide as represented by silica, silica-alumina, silica-magnesia or the like. As an additive to this precursor, there can be employed one or more of alumina, kaolin, bentonite and the like upon condition that the amount of silica derived from the hydrosol or hydrogel is 5 wt.% or more of a final catalyst composition.

As the crystalline aluminosilicate zeolite, there can be employed the one taking the hydrogen or rare earth form, and the so-called ultra-stable crystalline aluminosilicate zeolite is naturally included therein. The crystalline aluminosilicate zeolite in the hydrogen form is generally prepared by the steps of exchanging the alkali metal ions of a natural or synthetic crystalline aluminosilicate zeolite with ammonium ions and calcining the resulting aluminosilicate zeolite in the ammonium form. The catalyst composition prepared by the method according to the present invention is subjected to substantially the same heat treatment as the above calcination during its preparation and during its actual use as the catalyst. Therefore, the present invention can also use the crystalline aluminosilicate zeolite in the ammonium form. The amount of crystalline aluminosilicate zeolite is generally in the range of 5–50 wt.% of the final catalyst composition.

According to the method of the present invention, the above mentioned precursor of the porous matrix is mixed with the crystalline aluminosilicate zeolite, the same being added with alumina, kaolin, bentonite or the like in case of necessity, and thereafter the aqueous slurry of this mixture is spray-dried in a usual manner, whereby the fine spherical particle is prepared. The aqueous slurry in this instance may be adjusted so as to have an optional solid concentration within the range where spray-drying is applicable. As the conditions for spray-drying, there may be employed the conditions which have conventionally been employed in the preparation of cracking catalysts.

The fine spherical particle obtained by spray-drying is washed until the alkali metal content therein is reduced to 1.0 wt.% or less as oxide, and thereafter is dried. Then, the metal component selected from Group IVB of the Periodic Table is introduced in the dried particle. As the compounds used for metal introduction there may be used chlorides, sulfates, nitrates and acetates of Group IVB metal such as titanium, zirconium, hafnium or the like. This introduction is carried out in the manner of impregnating the fine spherical particle with an aqueous solution containing one or more kinds of Group IVB metal compounds. In this instance, it is preferable that impregnation of the metal component selected from Group IVB of the Periodic Table should be carried out in the manner of preparing for an aqueous IVB metal compound solution in the volume more than 2 times that of the fine spherical particle, and dipping it in said solution while stirring at least for 10 minutes.

The amount of the metal component of Group IVB of the Periodic Table introduced is adjusted to be in the range of 0.3-8 wt.% of the final catalyst composition as oxide. The reason is that when this range is deviated, it is impossible to improve the catalytic performance as intended by the present invention, and especially when the metal component of Group IVB is introduced in an amount exceeding the above range, the catalytic activity of the catalyst deteriorates. The fine spherical particle, in which the predetermined amount of the metal component of Group IVB has been introduced, is washed in case of necessity and dried, whereby the catalyst composition according to the present invention can be obtained.

Although the theoretical ground why the catalyst composition obtained according to the present invention exhibits a superior hydrocarbon catalytic cracking performance is not always clear, it is estimated that in the method of the present invention wherein the fine spherical particle is first prepared from the mixture of the precursor of the porous matrix and the crystalline aluminosilicate zeolite and then the metal component of Group IVB is introduced in this particle, a part of the metal component of Group IVB introduced in the catalyst combines with the porous matrix and the other part thereof ion-exchanges with the crystalline aluminosilicate zeolite, and thus the performance of the catalyst is improved depending on the mode of the existence of said metal component in the composition.

In this connection, it is to be noted that in case the metal component of Group IVB is added to the aqueous slurry containing the precursor of the porous matrix and the crystalline aluminosilicate zeolite, this metal component meets with the above precursor of high pH to deposit thereon and so does not ion-exchange with the crystalline aluminosilicate zeolite, and therefore it is impossible to obtain the catalyst of high efficiency as prepared by the method of the present invention even by the way of spray-drying the aqueous slurry added previously with the metal component of Group IVB.

Next, the present invention will be explained more concretely with reference to examples. It is to be noted that the present invention should not be limited to these examples.

EXAMPLE 1

A commercially available water glass No. 3 (JIS K 1408) was diluted to thereby prepare a water glass solution having a $SiO_2$ concentration of 12.73%. This water glass solution and the sulfuric acid regulated to have a concentration of 25% were mixed in the ratios of 20 l/min. and 5.6 l/min. continuously for 10 minutes, thereby preparing a silica hydrosol. This hydrosol was mixed with kaolin so that the kaolin weight might become 60% based in the weight of the final composition, and was further added with a 30% aqueous slurry of ammonium exchanged Y type crystalline aluminosilicate zeolite, designated as $NH_4$-Y, (exchange rate 92%) so that the crystalline aluminosilicate zeolite weight might become 20% based on the weight of the final catalyst composition. This mixture was spray-dried in hot air at a temperature of 220° C., and the resulting fine spherical particle was washed and thereafter dried to thereby prepare Catalyst A.

Next, 4 kinds of zirconium acetate solutions having such different concentrations that the zirconium contents in the catalyst might be 0.3 wt.%, 2.0 wt.%, 7.5 wt.% and 9 wt.% as oxide were prepared. 100 g of catalyst A was dispersed in each solution. This dispersion was stirred at room temperature for 30 minutes. Then, the solution was removed therefrom by means of Nutche, and the particle was washed and dried. Catalysts A-1, A-2, A-3 and A-4 were thus obtained.

EXAMPLE 2

Catalyst A obtained in Example 1 was calcined at 600° C. for 2 hours. 100 g of this catalyst was impregnated with 23 ml of an aqueous titanium lactate solution corresponding to the pore volume (0.23 ml/g) of said catalyst, and same was kept standing at room temperature for 1 hour and thereafter dried at 120° C. for 12 hours to thereby obtain Catalyst A-5. This catalyst was observed to contain titanium in an amount of 1.9 wt.% as oxide.

EXAMPLE 3

Catalyst B was obtained according to the exactly same procedure as Example 1 except that rare earth exchanged Y type crystalline aluminosilicate zeolite, designated as RE-Y, (exchange rate 67%) was employed in place of the ammonium exchanged Y type crystalline aluminosilicate zeolite.

Said Catalyst B was divided into three portions. They were dispersed in the aqueous solution of titanium chloride, zirconium acetate and hafnium acetate respectively. These dispersions were stirred at room temperature for 30 minutes, and thereafter the solutions were removed therefrom. The resulting particles were washed and dried to thereby prepare Catalysts B-1 to B-3. The amounts of metals of Group IVB in said catalysts are as shown below.

| Catalyst | B-1 | B-2 | B-3 |
| --- | --- | --- | --- |
| Group IVB metal (as oxide) | Ti 1.9 wt. % | Zr 1.8 wt. % | Hf 2.0 wt. % |

CATALYTIC PERFORMANCE TEST

The catalysts obtained in the above mentioned Examples were calcined at 600° C. for 2 hours, thereafter subjected to 17 hours' treatment at 750° C. in a 100% steam atmosphere, and further calcined at 600° C. for 1 hour. The thus treated catalysts were subjected to catalytic activity test. A hydrodesulfurized vacuum gas oil was employed as the feed oil. As the reaction conditions there were employed the following conditions: reaction temperature=482° C., WHSV=2.2 hr$^{-1}$, and catalyst-/oil ratio=5.6.

In order to value the thermal and hydrothermal stability, a part of catalysts were calcined at 600° C. for 2 hours, thereafter subjected to 17 hours' treatment at 810° C. in a 100% steam atmosphere, and then calcined at 600° C. for 1 hour. These catalysts were subjected to catalytic activity test.

The obtained catalytic activity test results are shown in the following table. As is evident from the results shown in the table, the catalysts obtained according to the method of the present invention are superior in the thermal and hydrothermal stability, and further can produce high octane gasolines.

TABLE

| Catalyst | A | | A-1 | | A-2 | | A-3 | | A-4 | A-5 | B | | B-1 | B-2 | B-3 |
|---|---|---|---|---|---|---|---|---|---|---|---|---|---|---|---|
| Metal component | None | | Zr | | Zr | | Zr | | Zr | Ti | None | | Ti | Zr | Hf |
| Amount as oxide wt. % | 0 | | 0.3 | | 2.0 | | 7.5 | | 9 | 1.9 | 0 | | 1.9 | 1.8 | 2.0 |
| Aluminosilicate | NH$_4$—Y | | NH$_4$—Y | | NH$_4$—Y | | NH$_4$—Y | | NH$_4$—Y | NH$_4$—Y | RE—Y | | RE—Y | RE—Y | RE—Y |
| Amount wt. % | 20 | | 20 | | 20 | | 20 | | 20 | 20 | 20 | | 20 | 20 | 20 |
| Steaming °C. | 750 | 810 | 750 | | 750 | 810 | 750 | | 750 | 750 | 750 | 810 | 750 | 750 | 750 |
| Cracking test results | | | | | | | | | | | | | | | |
| Conversion vol % | 74.9 | 61.1 | 75.0 | | 77.3 | 68.6 | 76.2 | | 73.8 | 76.8 | 68.5 | | 86.1 | 89.6 | 89.9 | 89.1 |
| C$_5$+ gasoline vol % | 64.9 | 54.2 | 64.7 | | 66.0 | 56.1 | 65.3 | | 64.2 | 65.7 | 55.9 | | 73.5 | 75.0 | 75.1 | 74.9 |
| Hydrogen vol % | 0.17 | 0.24 | 0.17 | | 0.18 | 0.25 | 0.18 | | 0.16 | 0.19 | 0.25 | | 0.29 | 0.30 | 0.30 | 0.29 |
| Coke wt. % | 4.5 | 3.2 | 4.5 | | 4.6 | 3.4 | 4.5 | | 4.3 | 4.6 | 3.4 | | 6.1 | 6.2 | 6.1 | 6.1 |
| Octane number | 92.8 | 93.0 | 93.1 | | 93.7 | 93.6 | 93.5 | | 93.0 | 93.7 | 93.6 | | 89.3 | 90.9 | 91.1 | 91.0 |

C$_5$+ gasoline: Range of boiling point C$_5$–204° C.

What is claimed is:

1. A method for preparing a catalytic cracking catalyst composition, which comprises: preparing an aqueous slurry containing a precursor of a porous matrix and a crystalline aluminosilicate zeolite selected from the group consisting of hydrogen-exchanged zeolite, rare earth-exchanged zeolite and ammonium-exchanged zeolite, spray-drying said slurry to obtain fine spherical particles, washing and drying said particles, and then incorporating into said particles at least one compound of a metal of Group IV-B of the Periodic Table.

2. A method according to claim 1 wherein the amount of said metal component selected from Group IVB of the Periodic Table introduced in the fine spherical particles is 0.3–8 wt.% of the final catalyst composition as oxide.

3. A method according to claim 1 wherein the metal component selected from Group IVB of the Periodic Table is one or more of titanium, zirconium and hafnium.

4. A method according to claim 1 wherein at least 5 wt.% of the final catalyst composition is the silica derived from the precursor of the porous matrix.

5. A method according to claim 1 wherein the crystalline aluminosilicate zeolite is used in the range of 5–50 wt.% of the final catalyst composition.

6. A method according to claim 1 wherein the metal component of Group IVB is introduced by the impregnation method.

7. A method for preparing a catalytic cracking catalyst composition, which consists essentially of the steps of: preparing an aqueous slurry containing a precursor of a porous siliceous matrix selected from the group consisting of silica, silica-alumina and silica-magnesia and a crystalline aluminosilicate zeolite selected from the group consisting of hydrogen-exchanged zeolite, rare earth-exchanged zeolite and ammonium-exchanged zeolite, spray-drying said slurry to obtain fine spherical particles, washing said particles to reduce the alkali metal content thereof to 1.0 wt.% or less, calculated as the oxide, then drying said particles, then impregnating said particles with an aqueous solution of at least one water-soluble compound selected from the group consisting of the chlorides, sulfates, nitrates and acetates of titanium, zirconium and hafnium, and then drying said particles, said particles containing from 5 to 50 wt.% of said crystalline aluminosilicate zeolite and from 0.3 to 8.0 wt.% of titanium, zirconium or hafnium, calculated as the oxide.

* * * * *